United States Patent [19]
Conti et al.

[11] Patent Number: 5,644,023
[45] Date of Patent: Jul. 1, 1997

[54] PROCESS FOR THE MANUFACTURE OF COPOLYMERS OF ETHYLENE AND CARBON MONOXIDE

[75] Inventors: Nicholas Joseph Conti, Flemington; Frederick John Karol, Belle Mead; George Norris Foster, Bloomsbury, all of N.J.

[73] Assignee: Union Carbide Chemicals & Plastics Technology Corporation, Danbury, Conn.

[21] Appl. No.: 871,652

[22] Filed: Apr. 21, 1992

[51] Int. Cl.⁶ .................... C08G 67/02; B01J 31/18
[52] U.S. Cl. ................. 528/392; 525/539; 502/162; 502/168; 502/171; 502/200; 502/204; 502/207; 502/208; 502/210; 502/213; 502/216; 502/219; 502/222; 502/302; 502/305; 502/324; 502/325; 502/326; 502/349; 502/353; 502/355
[58] Field of Search ............... 528/392; 525/539; 502/162, 168, 171, 200, 204, 207, 208, 210, 213, 216, 219, 222, 302, 305, 324, 325, 326, 349, 353, 355

[56] References Cited

U.S. PATENT DOCUMENTS

| | | | |
|---|---|---|---|
| 4,778,876 | 10/1988 | Doyle et al. | 528/392 |
| 4,806,630 | 2/1989 | Drent et al. | 528/392 |
| 4,824,934 | 4/1989 | van Broekhoven et al. | 528/392 |

FOREIGN PATENT DOCUMENTS

| | | |
|---|---|---|
| 257663 | 2/1988 | European Pat. Off. |
| 263564 | 4/1988 | European Pat. Off. |
| 404228 | 12/1990 | European Pat. Off. |

*Primary Examiner*—James J. Seidleck
*Assistant Examiner*—Rabon Sergent
*Attorney, Agent, or Firm*—Saul R. Bresch

[57] ABSTRACT

A process comprising:

(a) introducing a mixture comprising one or more alpha-olefins, carbon monoxide, and, optionally, one or more dienes into a reaction zone under polymerization conditions;

(b) contacting the mixture with a catalyst prepared by a process comprising:
  (i) providing a transition metal in the zero valence state adsorbed on a support;
  (ii) reacting the supported metal with an oxidant to form a supported compound wherein the metal has a positive valence;
  (iii) ligating the supported compound with a ligand; and (c) introducing a reoxidant into the reaction zone to maintain the positive valence of the metal.

14 Claims, 3 Drawing Sheets

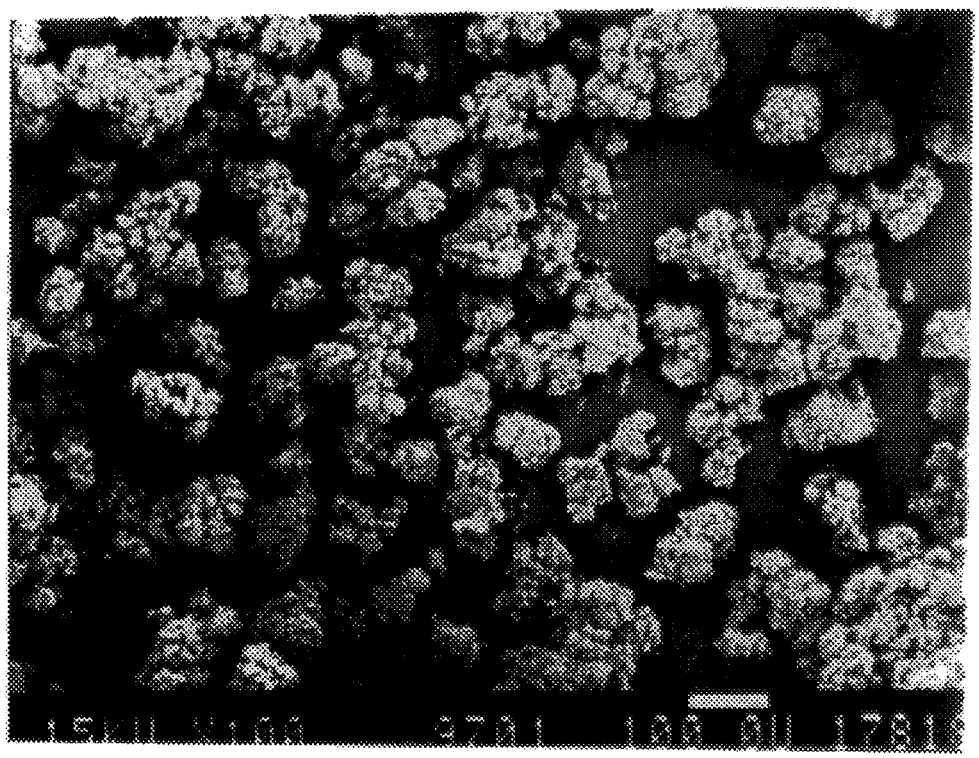
F I G. 1

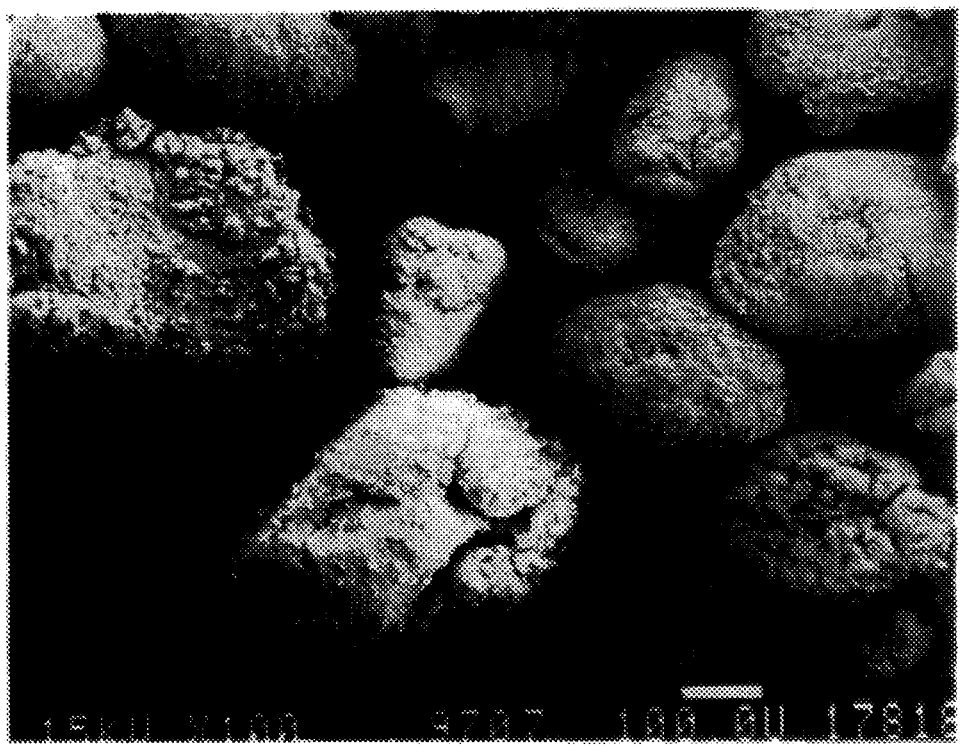
F I G. 2

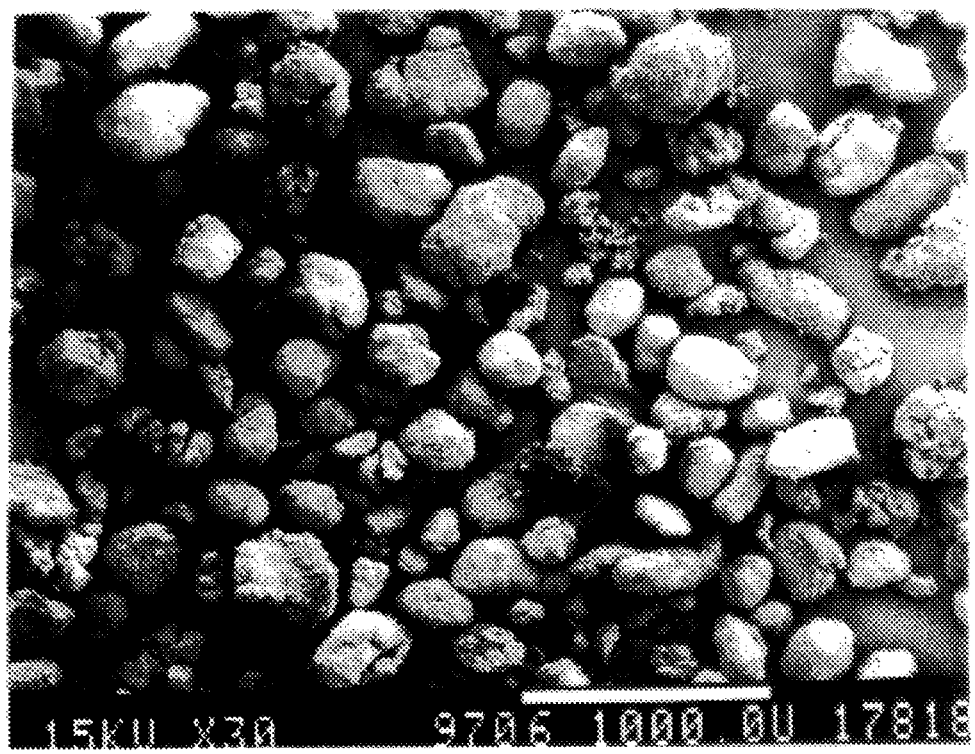
F I G. 3 ively expensive. Therefore, finding means to maximize
5,644,023

PROCESS FOR THE MANUFACTURE OF COPOLYMERS OF ETHYLENE AND CARBON MONOXIDE

TECHNICAL FIELD

This invention relates to a process for the manufacture of polymers of carbon monoxide and at least one unsaturated organic compound.

BACKGROUND INFORMATION

The production of linear copolymers of alternating carbon monoxide and ethylene [poly(ethylene-alt-carbon monoxide) referred to as PEACO], or other copolymers of ethylene and one or more unsaturated organic compounds via catalysts in a slurry reaction system employing a polar diluent such as methanol, chloroform, methylene chloride, or acetone, or a mixture of these or other similar diluents is seriously hampered by reactor fouling. The polymer produced coats the walls, cooling coils, stirrer, thermocouples, and other internal structures of the reactor. See, for example, the discussion of this problem in European Patent Application 0 404 228. Removal of this coating is laborious and requires the use of a die grinder and wire brushes. After a three hour polymerization run, it can take over two hours to clean the reactor. Part of the polymer produced in this manner is unusable as it is highly discolored and not granular. The purity and the bulk properties of the polymer may be adversely affected by such material. The polymer also has an irregular morphology. Further, samples removed from the reactor contain clumps and do not flow well.

A catalyst which would reduce reactor fouling is highly desirable. If reactor fouling is reduced, increases in reactor operability would result. The elimination of reactor fouling is especially important in a continuous production unit.

A catalyst which does not require a polar diluent in the reactor, but can produce PEACO in either polar or non-polar diluents, would be an additional improvement since this would broaden the flexibility of the process. Also, non-polar diluents, e.g., hexane or heptane, would be less likely to swell the polymer hence contamination of the polymer by components of the catalyst system would be less likely. This would be reflected in a higher level of polymer purity and alleviate the need for costly post-reactor operations to remove contaminants from the resin.

Supported catalysts would also allow the polymer to be produced in a gas phase reaction system. Crucial to this, is the ability of the supported catalyst to control the morphology of the produced polymer particle. The catalyst should yield a polymer particle with properties, such as bulk density and sphericity, within a range which will allow for fluidization. The control of these properties leads to improvements in the handling characteristics of the polymer such as its flowability.

Supported catalysts are described in the prior art of PEACO production. U.S. Pat. No. 4,778,876 discloses a process for producing PEACO using catalyst solutions supported on organic or inorganic carrier materials including polymers such as PEACO itself. The patent teaches that polymers of higher molecular weight will result when hydrogen is present in the reactor during polymerization than when it is absent. Lower molecular weight polymers are achieved by raising the temperature of the polymerization. A supported catalyst which produces lower molecular weight polymers in the presence of hydrogen is not disclosed. Furthermore, the use of hydrogen as a chain transfer agent would allow one to obtain relatively lower molecular weight polymers without having to run polymerizations at elevated temperatures.

Supported catalysts are also described in European patent application 0 404 228. The production of these catalysts requires the synthesis of ligands with pendant reactive groups which can react with suitable functionalized supports prior to metallation under the appropriate reaction conditions. A supported catalyst which would not require exotic ligands and which was less complex to prepare would lower the cost of producing PEACO with supported catalyst systems.

The metallic components of these catalyst systems are relatively expensive. Therefore, finding means to maximize the metal normalized activity of the catalyst is highly desirable. Since operating costs increase as the pressure requirements of a reactor system increase, it would be beneficial to find ways of achieving acceptable catalyst activities at the lowest possible reaction pressures. Materials which, when present in the reaction zone, increase the activity of the catalyst allowing reaction pressures to be lowered would be of significant value to a catalytic PEACO production process.

DISCLOSURE OF THE INVENTION

An object of this invention, therefore, is to provide a high activity, low pressure process for the manufacture of PEACO using a supported catalyst in which reactor fouling is essentially eliminated and which can be run in the gas phase with essentially no diluents, or in a slurry process employing polar or non-polar diluents or some mixture of them.

Other objects and advantages will become apparent hereinafter.

According to the present invention, the above object is met by a process comprising:

(a) introducing a mixture comprising one or more alpha-olefins, carbon monoxide, and, optionally, one or more dienes into a reaction zone under polymerization conditions;

(b) contacting the mixture with a catalyst prepared by a process comprising:

(i) providing a transition metal in the zero valence state adsorbed on a support;

(ii) reacting the supported metal with an oxidant to form a supported compound wherein the metal has a positive valence;

(iii) ligating the supported compound with a ligand; and, optionally, (c) introducing a reoxidant into the reaction zone to maintain the positive valence of the metal.

BRIEF DESCRIPTION OF THE DRAWINGS

FIG. 1 is a photograph of polymer particles obtained from an unsupported catalyst system run in a methylene chloride slurry (at 100× magnification).

FIG. 2 is a photograph of polymer particles obtained from a supported catalyst system run in a methylene chloride slurry (at 100× magnification).

FIG. 3 is a photograph of polymer particles obtained from a supported catalyst system run in a methylene chloride slurry (at 30× magnification).

DESCRIPTION OF THE PREFERRED EMBODIMENT(S)

The polymers can be prepared in the gas phase or the liquid phase generally under pressures in the range of about 1 to about 2000 psig, preferably at pressures in the range of about 100 to about 1500 psig, and most preferably in the range of about 300 to about 1000 psig. In the mixture to be polymerized, the molar ratio of olefin monomer(s), i.e., alpha-olefins and dienes, to carbon monoxide can be in the range of about 0.2:1 to about 5:1, preferably about 0.5:1 to about 2:1, and most preferably about 1:1.

The alpha-olefins can have 2 to 12 carbon atoms and preferably have 2 to 8 carbon atoms. Examples of suitable alpha-olefins are ethylene, propylene, 1-butene, 1-hexene, 4-methyl-1-pentene, and 1-octene. Ethylene is preferably at least one of the alpha-olefins. The dienes can have 4 to 30 carbon atoms and preferably have 4 to 18 carbon atoms. Examples of suitable dienes are ethylidene norbornene, butadiene, 1,4-hexadiene, 1,6-octadiene, and 1,8-decadiene.

Whether the polymerization is carried out in the gas phase or the liquid phase, the use of a chain transfer agent, such as hydrogen, to terminate the polymer chain is preferred. Usually, the molar ratio of hydrogen, if present, will vary between about 0.02 to about 1 mole of hydrogen per mole of olefin monomer(s). The molar ratio is preferably in the range of about 0.06 to about 0.75 mole of hydrogen per mole of olefin monomer(s). This translates into a hydrogen partial pressure in the range of about 10 to about 300 psig and preferably about 25 to about 245 psig where the olefin partial pressure is in the range of about 300 to about 445 psig.

The first step in the preparation of the catalyst is to provide a transition metal in the zero valence state as an adsorbed metal on the surface of a support. Suitable transition metals are palladium, nickel, and rhodium. The support can be alumina, silica, aluminum phosphate, silica/alumina mixtures, silica modified with an organoaluminum compound such as triethylaluminum, silica modified with diethylzinc, calcium carbonate, barium sulfate, and carbon. Gamma-alumina is a preferred support.

The aforementioned supports are all considered to be inert, i.e., they are neither catalysts nor reactants. Polymers such as PEACO or other polymers produced by the process can also be used as supports.

Palladium is a preferred transition metal and there are several commercially available palladium (zero) support combinations, e.g., palladium on alumina, palladium on barium sulfate, palladium on calcium carbonate, palladium on carbon, palladium on activated carbon, and palladium on barium carbonate.

The amount of transition metal per gram of support can be in the range of about $9.4 \times 10^{-6}$ to about $4.7 \times 10^{-3}$ gram atom of transition metal per gram of support, is preferably in the range of about $9.4 \times 10^{-5}$ to about $1.9 \times 10^{-3}$ gram atom of transition metal per gram of support, and most preferably about $9.4 \times 10^{-4}$ gram atom of transition metal per gram of support. In terms of weight percent, the amount of transition metal can be in the range of about 0.1 to about 50 percent by weight, is preferably in the range of about 1 to about 20 percent by weight, and is most preferably about 10 percent by weight, all based on the weight of the support.

The supported transition metal in the zero valence state is then reacted with an oxidant (an oxidizing compound) to form a compound in which the transition metal has a positive valence.

In the case of palladium, the palladium (zero) is reacted with the oxidant to form a compound in which the palladium has a valence of two. Suitable oxidants are nitrosonium tetrafluoroborate, [NO][BF$_4$]; nitrosonium hexafluorophosphate, [NO][PF$_6$]; nitrosonium hexafluoroantimonate, [NO][SbF$_6$]; and t-butyl nitrite. Generally speaking, however, any conventional oxidizing compound will suffice. The oxidation is generally carried out in a solvent such as acetonitrile or nitromethane. The solvent is then removed, usually in vacuo. The amount of oxidant can be in the range of about 1 to about 3.5 moles of oxidant per gram atom of transition metal, is preferably in the range of about 1.5 to about 2.5 moles of oxidant per gram atom of transition metal, and most preferably is about 2 moles of oxidant per gram atom of transition metal.

The resulting compound containing a transition metal having a positive valence is then ligated with a ligand such as bis(1,3-diphenyl phosphino)propane or any ligand of phosphorus, nitrogen, antimony, arsenic, and sulfur. Examples of suitable ligands are triphenyl phosphine and 1,10-phenanthroline. The ligand is usually bidentate. The ligation is accomplished in a solvent such as methylene chloride, methanol, acetone, or nitromethane. Methylene chloride is preferred. The amount of bidentate ligand can be in the range of about 0.5 to about 2 moles of bidentate ligand per gram atom of transition metal, is preferably in the range of about 0.75 to about 1.5 moles of bidentate ligand per gram atom of transition metal, and most preferably about one mole of bidentate ligand per gram atom of transition metal. If a monodentate ligand is used, the amounts given for the bidentate ligand are doubled. Again, the solvent is removed, usually in vacuo. Thus, essentially no solvent enters the polymerization reactor.

The transition metal loading, i.e., the gram of transition metal per gram of catalyst, can be in the range of about 0.001 to about 0.50 gram of transition metal per gram of catalyst and is preferably in the range of about 0.01 to about 0.20 gram of transition metal per gram of catalyst. These values are particularly relevent where palladium is the transition metal. The "catalyst" includes the transition metal, the oxidant, the ligand, and the support.

The preparation of the catalyst, from start to finish, is carried out under an inert atmosphere such as nitrogen. The amount of solvent used in all of the catalyst preparation procedures is an amount sufficient to dissolve the reactants or to produce a tractable, stirrable slurry. Usually, an excess of solvent is used. The reactants are generally mixed or stirred to provide efficient contact so that the reaction will be complete. The oxidation of the transition metal to a positive valence generally takes from about 8 to 48 hours at room temperature while the ligation is usually completed in about 15 minutes to an hour.

As noted above, the catalyst is advantageously utilized in both the gas and liquid phases. The preferred gas phase reactor is a fluidized bed while the preferred form in which the liquid phase is carried out is via a slurry polymerization.

The slurry polymerization is typically carried out in a stirred, hermetically sealed reactor. Solvents such as hexane, methanol, and methylene chloride can be used as diluents. The pressure is generally maintained in the range of about 1 to about 2000 psig; the temperature in the range of about 20° to about 200° C.; and the residence time in the range of about 0.25 to about 8 hours. The fluidized bed polymerization is typically carried out under the same conditions of pressure, temperature, and residence time. A typical fluidized bed reactor is described in U.S. Pat. No. 4,482,687.

The amount of catalyst introduced into the reaction zone, whether gas phase or liquid phase, can be in the range of about $1.0 \times 10^{-6}$ to about $4.0 \times 10^{-4}$ gram atom of transition metal per mole of olefin(s) and is preferably in the range of about $1.0 \times 10^{-5}$ to about $4.0 \times 10^{-5}$ gram atom of transition metal per mole of olefin(s).

Reoxidants, which are simply oxidizing compounds added to reoxidize any catalytically active compound which has been reduced in situ, are, optionally, added to the reactor to maintain catalyst activity at a high level. Examples of reoxidants are p-benzoquinone, t-butyl nitrite, and oxygen-copper(II) chloride couple. The t-butyl nitrite is particularly effective as a reoxidant in gas phase polymerizations.

Promoters such as polymeric 1,2-dihydro-2,2,4-trimethyl quinoline, sterically hindered aliphatic or aromatic amines, and substituted pyridines are useful in the slurry polymerization.

The reoxidant, if used, can be introduced into the reaction zone in an amount of about 0.01 to about 1000 moles of reoxidant per gram atom of transition metal and is preferably introduced in an amount of about 1 to about 500 moles of reoxidant per gram atom of transition metal. The promoter, if used, can be introduced into the reaction zone in an amount of about 0.1 to about 2500 grams of promoter per gram atom of transition metal and is preferably introduced into the reaction zone in an amount of about 250 to about 1500 grams of promoter per gram atom of transition metal.

The advantages of the process of this invention are that reactor fouling is essentially eliminated both in the gas-phase and slurry polymerizations; a polar diluent for conveying the catalyst and gases into the reactor and for operating the reactor is unnecessary; the morphology of the polymer particles is improved resulting in improved process operability; the catalyst is simpler to reproducibly synthesize than previously known supported catalysts; and hydrogen can be used to lower the molecular weight of the resulting polymer.

The molecular weight of the polymers described in this invention will correlate to higher Limiting Viscosity Numbers (LVN) expressed in dl/g. LVN is also known by the term "intrinsic viscosity." LVN is obtained by preparing four solutions of differing concentrations (between 0.5 to 2.0 weight percent polymer in m-cresol) and measuring the time it takes a fixed amount of solution to flow through a viscometer at a constant temperature (100° C.). The ratio of this efflux time ($t_p$) to that of pure solvent ($t_s$) gives the relative viscosity ($\eta_{rel}=t_p/t_s$). The specific viscosity is the relative viscosity minus one: $\eta_{sp}=\eta_{rel}-1$. The LVN is obtained by dividing the specific viscosity by concentration and extrapolating to zero concentration $[\eta sp/c]_{c=0}=LVN$.

Various observations have been made with regard to the process of the invention:

(i) supported catalysts cause no reactor fouling under slurry or gas-phase conditions;

(ii) supported catalysts produce larger, smoother, more spherical polymer particles than unsupported catalysts (FIGS. 1, 2, and 3);

(iii) supported catalysts are more active than unsupported catalysts even when the unsupported catalyst is run in the presence of reoxidant and promoter (compare Example 3 with Example 4, and Example 5 with Example 6, in Table I);

(iv) supported catalysts produce polymers with higher bulk densities than unsupported catalysts (compare Example 5 with Example 6 in Table I);

(v) supported catalysts are more active under gas-phase conditions than in polar or non-polar diluent slurries (compare Examples 3, 5, and 7 in Table I);

(vi) supported catalysts under gas-phase conditions produce polymers with higher bulk densities than under slurry conditions (compare Examples 3, 5, and 7 in Table I);

Note: In items (v) and (vi) above, a promoter is present in example 7; there is no promoter in examples 3 and 5.

(vii) the molecular weight, as measured by the LVN, of polymers produced with supported catalysts decreases with increasing concentrations of hydrogen in the reactor (compare Examples 3, 9, and 10 in Table I);

(viii) the presence of hydrogen improves the activity of the supported catalyst (compare Examples 3, 9, and 10 in Table I);

(ix) in the absence of reoxidant or promoter, the activity of supported catalysts increases as the transition metal loading (weight percent) increases (compare Example 3 and Example 15 in Table I);

(x) the presence of suitable amounts of reoxidants and/or promoters increases the activity of supported catalysts, and there is little variation of activity with different catalyst loadings (compare Examples 3, 12, and 13, and Examples 14, 15 and 16 in Table I);

(xi) the activity of the supported catalyst is improved when the polymerization is carried out at 120° C. but decreases at 160° C. (compare Examples 13, 16, 17, and 18 in Table I);

(xii) the length of time the supported transition metal (zero) is exposed to the oxidant during the catalyst preparation does not appear to effect the activity of the catalyst. Oxidation periods of 18, 47, and 60 hours give catalysts with similar activities (compare Examples 3, 22, and 23 in Table II);

(xiii) oxidation and ligation of the supported transition metal (zero) can be accomplished in a one-pot, two-step procedure to yield a catalyst with activity equivalent to that of one prepared by oxidation in acetonitrile and ligation in methylene chloride (compare Example 3 with Example 19 in Table II);

(xiv) increasing the concentration of oxidant causes inactive material to be generated (compare Example 3 with Example 24 in Table II);

(xv) a molar ratio of about 1 mole of bidentate phosphorus ligand to one mole of oxidized palladium (P/Pd of about 2) appears to be optimum and about 0.75 to about 1.75 moles of bidentate ligand to one mole of oxidized palladium (P/Pd of about 1.5 to about 3.5) is preferred. Lower and higher ratios, e.g., P/Pd of 1 or 4, give lower activities (compare Examples 3, 20, and 21 in Table II). These results can be extrapolated to all ligand/transition metal molar ratios; and (xvi) the presence of suitable amounts of promoter increases the molecular weight of the polymer produced in hexane slurry (compare Examples 3 and 12).

The patent applications and patents referred to in this specification are incorporated by reference herein.

The invention is illustrated by the following examples.

EXAMPLE 1

A dry flask is charged with 1 gram of supported palladium (0) (10 weight percent palladium on gamma-$Al_2O_3$), 15 milliliters of acetonitrile, and 2 moles of nitrosonium tetrafluoroborate per gram atom of palladium(0). The mixture has a black color. It is allowed to stir overnight (18 hours) under a nitrogen blanket at room temperature. A palladium (II) compound is formed, the mixture turning a dull yellow. The acetonitrile is removed in vacuo. Twenty five milliliters of a methylene chloride solution of bis(1,3-diphenylphosphino)propane (1 mole of the phosphorous containing ligand per gram atom of palladium) is added, using a stainless steel cannula, under nitrogen. The mixture is allowed to stir for 15 minutes before the liquid is removed in vacuo. The ligation is now completed, and essentially all of the solvent is removed yielding a solid.

EXAMPLE 2

A dry flask is charged with 2.023 grams of palladium (0) sponge, 4.40 grams of nitrosonium tetrafluoroborate, and 75 milliliters of dry, nitrogen-purged acetonitrile. The mixture is allowed to stir overnight (24 hours) under a nitrogen blanket at room temperature. Under an inert atmosphere, the mixture is filtered and enough diethyl ether is added to the liquid to precipitate a yellow solid. This solid is separated by filtration and dried in vacuo under nitrogen at room temperature for 1 to 2 hours to yield 6.835 grams of tetrakis (acetonitrile) palladium(II) ditetrafluoroborate [$(CH_3CN)_4Pd][BF_4]_2$.

A dry flask is charged with 0.134 grams of tetrakis (acetonitrile) palladium(II) ditetrafluoroborate, 0.091 gram of bis(1,3-diphenylphosphino)propane (one mole of the phosphorus containing ligand per gram atom palladium), and 30 millitiers of dry, nitrogen-purged methylene chloride. The mixture is allowed to stir for 15 to 30 minutes under nitrogen at room temperature. This mixture is then transferred using inert atmosphere techniques into a reaction vessel for polymerization.

EXAMPLE 3

An ethylene/carbon monoxide copolymer is prepared as follows. One liter of dry, nitrogen-purged hexane is admitted to a one-gallon stainless steel autoclave reactor fitted with a magnetically driven anchor stirring paddle. One gram of supported catalyst prepared as in Example 1 (palladium loading=0.1 gram Pd per gram of catalyst) is transferred into the reactor using a nitrogen stream. The reactor is hermetically sealed, and the stirrer speed is set to 300 rpm. The reactor is flushed with hydrogen (150 to 0 psig) three times and then filled with 75 psig of hydrogen. The reactor pressure is brought to 500 psig with a 1:1 (molar ratio) mixture of ethylene and carbon monoxide in gaseous form. The vessel is heated to and maintained at 75° C. at which point the pressure is increased to 870 psig with the ethylene/carbon monoxide mixture. After 4 hours, the reactor is cooled to room temperature as the pressure is released. The reaction rate is 290 grams polymer per gram Pd per hour. The polymer produced had an LVN of 2.06 dl/g and a bulk density of 16.7 pounds per cubic foot.

EXAMPLE 4

A copolymer is prepared from an unsupported catalyst, prepared as in Example 2, in the same manner as in Example 3 except:

(a) p-benzoquinone (4.88 grams) and polymeric 1,2-dihydro-2,2,4-trimethyl quinoline (2.48 grams) are added to the reactor (b) the reaction temperature is 85° C.

(c) the total reactor pressure is maintained at 890 psig.

The reaction rate is 80 grams of polymer per gram Pd per hour.

EXAMPLE 5

A copolymer is prepared from a supported catalyst in the same manner as in Example 3 except:

(a) one liter of methylene chloride is used in place of hexane (b) the reaction temperature is 87° C.

(c) the total reactor pressure is maintained at 890 psig.

The reaction rate is 730 grams of polymer per gram Pd per hour. The polymer produced has an LVN of 1.56 dl/g and a bulk density of 17.9 pounds per cubic foot.

EXAMPLE 6

A copolymer is prepared from an unsupported catalyst, prepared as in Example 2, in the same manner as in Example 3 except:

(a) one liter of methylene chloride is used in place of hexane (b) the total reactor pressure is maintained at 900 psig (c) the reaction time is 3.5 hours.

The reaction rate is 190 grams of polymer per gram Pd per hour. The polymer produced has an LVN of 1.76 dl/g and a bulk density of 5.8 pounds per cubic foot.

EXAMPLE 7

An ethylene/carbon monoxide copolymer is prepared as follows: A one gallon stainless steel autoclave reactor fitted with a double helical stirrer is charged to approximately half its depth with a bed of PEACO (6.5 inches). The reactor is heated to 100° C. under a stream of nitrogen for 3 hours. The reactor is cooled and 2 grams of a supported catalyst (Pd loading=0.065 gram Pd/gram catalyst), prepared as in Example 1, is added to the reactor under a nitrogen stream via a polyethylene cannula. Fourteen moles of t-butyl nitrite per gram atom of palladium is added via syringe. The reactor is hermetically sealed, and the stirrer speed is set to 300 rpm. The reactor is flushed with hydrogen (150 to 0 psig) three times and then filled with 75 psig of hydrogen. The reactor pressure is brought to 600 psig with a 1:1 (molar ratio) mixture of ethylene and carbon monoxide in gaseous form. The vessel is heated to 75° C. at which point the pressure is increased to 900 psig. The reaction temperature is maintained between 82° and 117° C. After 4 hours, the reactor is cooled to room temperature as the pressure is released. The reaction rate is 1,580 grams of polymer per gram Pd per hour. The polymer produced has an LVN of 1.07 dl/g and a bulk density of 22.1 pounds per cubic foot. The yield of polymer is 825 grams.

EXAMPLE 8

An experiment is performed in the same manner as in Example 7 except:

(a) no catalyst is added to the reactor;

(b) the PEACO bed used is obtained from the yield of Example 7;

(c) the reaction temperature is 75° C.

The yield of polymer is 8 grams.

EXAMPLE 9

A copolymer is prepared from a supported catalyst in the same manner as in Example 3 except:

(a) no hydrogen is present in the reactor;

(b) the total reactor pressure is maintained at 900 psig;

(c) the reaction time is 3 hours.

The reaction rate is 100 grams of polymer per gram Pd per hour. The polymer produced has an LVN of 4.44 dl/g and a bulk density of 17.9 pounds per cubic foot.

EXAMPLE 10

A copolymer is prepared from a supported catalyst in the same manner as in Example 3 except:

(a) the reactor is charged with 200 psig of hydrogen;

(b) the total reactor pressure is maintained at 900 psig;

(c) the reaction time is 3 hours.

The reaction rate is 310 grams of polymer per gram Pd per hour. The polymer produced has an LVN of 1.99 dl/g and a bulk density of 16.0 pounds per cubic foot.

EXAMPLE 11

A copolymer is prepared from a supported catalyst in the same manner as in Example 3 except:

(a) p-benzoquinone (76 moles per gram atom of Pd) is added to the reactor;

(b) the reaction time is 3 hours.

The reaction rate is 200 grams of polymer per gram Pd per hour. The polymer produced has an LVN of 2.53 dl/g and a bulk density of 16.7 pounds per cubic foot.

EXAMPLE 12

A copolymer is prepared from a supported catalyst in the same manner as in Example 3 except:

(a) polymeric 1,2-dihydro-2,2,4-trimethyl quinoline (0.5 gram) is added to the reactor;

(b) the total reactor pressure is maintained at 900 psig;

(c) the reaction time is 3 hours.

The reaction rate is 430 grams of polymer per gram Pd per hour. The polymer produced has an LVN of 4.39 dl/g and a bulk density of 22.4 pound per cubic foot.

EXAMPLE 13

A copolymer is prepared from a supported catalyst in the same manner as in Example 3 except:

(a) p-benzoquinone (49 moles per gram atom of Pd) and polymeric 1,2-dihydro-2,2,4-trimethyl quinoline (0.5 gram) are added to the reactor;

(b) the total reactor pressure is maintained at 900 psig.

The reaction rate is 430 grams of polymer per gram Pd per hour. The polymer produced has an LVN of 3.40 dl/g and a bulk density of 25.0 pounds per cubic foot,

EXAMPLE 14

A copolymer is prepared from a supported catalyst in the same manner as in Example 3 except:

(a) t-butyl nitrite (17 moles per gram atom of Pd) is added to the reactor;

(b) the total reactor pressure is maintained at 900 psig;

(c) the reaction time is 3 hours;

(d) the catalyst is prepared from a 5 weight percent Pd on alumina material yielding a loading of 0.04 gram Pd/gram catalyst.

The reaction rate is 230 grams of polymer per gram Pd per hour. The polymer produced has an LVN of 5.14 dl/g.

EXAMPLE 15

A copolymer is prepared from a supported catalyst in the same manner as in Example 3 except:

(a) the total reactor pressure is maintained at 900 psig;

(b) the catalyst is prepared from a 5 weight percent Pd on alumina material yielding a loading of 0.04 gram Pd/gram catalyst.

The reaction rate is 150 grams of polymer per gram Pd per hour. The polymer produced has an LVN of 3.30 dl/g and a bulk density of 19.2 pounds per cubic foot.

EXAMPLE 16

A copolymer is prepared from a supported catalyst in the same manner as in Example 3 except:

(a) p-benzoquinone (386 moles per gram atom of Pd) and polymeric 1,2-dihydro-2,2,4-trimethyl quinoline (0.5 gram) are added to the reactor;

(b) the total reactor pressure is maintained at 900 psig;

(c) the reaction time is 3 hours;

(d) the catalyst is prepared from a 5 weight percent Pd on alumina material yielding a loading of 0.04 gram Pd/gram catalyst.

The reaction rate is 470 grams of polymer per gram Pd per hour. The polymer produced has an LVN of 3.19 dl/g and a bulk density of 25.0 pounds per cubic foot.

EXAMPLE 17

A copolymer is prepared from a supported catalyst in the same manner as in Example 3 except:

(a) p-benzoquinone (93 moles per gram atom of Pd) and polymeric 1,2-dihydro-2,4,4-trimethyl quinoline (0.5 gram) are added to the reactor;

(b) the reaction temperature is 120° C.;

(c) the total reactor pressure is maintained at 900 psig;

(d) the reaction time is 3 hours;

(e) the catalyst is prepared from a 5 weight percent Pd on alumina material yielding a loading of 0.04 gram Pd/gram catalyst.

The reaction rate is 1,040 grams of polymer per gram Pd per hour. The polymer produced has an LVN of 0.28 dl/g and a bulk density of 37.2 pounds per cubic foot.

EXAMPLE 18

A copolymer is prepared from a supported catalyst in the same manner as in Example 3 except:

(a) p-benzoquinone (76 moles per gram atom of Pd) and polymeric 1,2-dihydro-2,2,4-trimethyl quinoline (0.5 gram) are added to the reactor;

(b) the reaction temperature is 160° C.;

(c) the total reactor pressure is maintained at 900 psig; and (d) the reaction time is 3 hours.

The reaction rate is 60 grams of polymer per gram Pd per hour.

EXAMPLE 19

A supported catalyst is prepared in the same manner as in Example 1 except that nitromethane is used instead of acetonitrile and methylene chloride in both the oxidation and ligation steps.

A copolymer is prepared from this supported catalyst in the same manner as in Example 3 except:

(a) the total reactor pressure is maintained at 900 psig;

(b) the reaction time is 3.5 hours.

The reaction rate is 250 grams of polymer per gram Pd per hour. The polymer produced has an LVN of 3.00 dl/g and a bulk density of 20.5 pounds per cubic foot.

EXAMPLE 20

A supported catalyst is prepared in the same manner as in Example 1 except:

(a) the methylene chloride solution of bis(1,3-diphenylphosphino)propane contains 0.5 mole of phosphorous containing ligand per gram atom of palladium (P/Pd=1).

A copolymer is prepared from this supported catalyst in the same manner as in Example 3 except:

(a) the total reactor pressure is maintained at 900 psig;

(b) the reaction time is 3 hours.

The reaction rate is 20 grams of polymer per gram Pd per hour.

EXAMPLE 21

A supported catalyst is prepared in the same manner as in Example 1 except:

(a) the methylene chloride solution of bis(1,3-diphenylphosphino)propane contains 2 moles of phosphorous containing ligand per gram atom of palladium (P/Pd=4).

A copolymer is prepared from this supported catalyst in the same manner as in Example 3 except:

(a) the total reactor pressure at 75° C. is maintained at 900 psig;

(b) the reaction time is 3.5 hours.

The reaction rate is 100 grams of polymer per gram Pd per hour. The polymer produced has an LVN of 4.24 dl/g.

EXAMPLE 22

A supported catalyst is prepared in the same manner as in Example 1 except:

(a) the supported palladium, acetonitrile, and nitrosonium tetrafluoroborate mixture is allowed to stir for 47 hours.

A copolymer is prepared from this supported catalyst in the same manner as in Example 3 except:

(a) the total reactor pressure is maintained at 900 psig.

The reaction rate is 280 grams of polymer per gram Pd per hour. The polymer produced has an LVN of 3.04 dl/g and a bulk density of 21.8 pounds per cubic foot.

EXAMPLE 23

A supported catalyst is prepared in the same manner as in Example 1 except:

(a) the supported palladium, acetonitrile, and nitrosonium tetrafluoroborate mixture is allowed to stir for 60 hours.

A copolymer is prepared from this supported catalyst in the same manner as in Example 3 except:

(a) the total reactor pressure is maintained at 900 psig;

(b) the reaction time is 3.5 hours.

The reaction rate is 350 grams of polymer per gram Pd per hour. The polymer produced has an LVN of 2.64 dl/g and a bulk density of 25.0 pounds per cubic foot.

EXAMPLE 24

A supported catalyst is prepared in the same manner as in Example 1 except:

(a) four moles of nitrosonium tetrafluoroborate per gram atom of palladium are used.

A copolymer is prepared from this supported catalyst in the same manner as in Example 3 except:

(a) the total reactor pressure is maintained at 900 psig;

(b) the reaction time is 3 hours.

A negligible amount of polymer is produced in the reaction.

Variables and results are summarized in Tables I and II.

TABLE I

| Example | Catalyst | Loading (g/Pd/g) | Diluent | Hydrogen (psig) | Total Pressure (psig) | Temp. (°C.) | Time (hours) |
|---|---|---|---|---|---|---|---|
| 3 | supported | 0.1 | hexane | 75 | 870 | 75 | 4 |
| 4 | unsupported | — | hexane | 75 | 890 | 85 | 4 |
| 5 | supported | 0.1 | methylene chloride | 75 | 890 | 87 | 4 |
| 6 | unsupported | — | methylene chloride | 75 | 900 | 75 | 3.5 |
| 7 | supported | 0.1 | gas-phase | 75 | 900 | 82 | 4 |
| 8 | none | 0.1 | gas-phase | 75 | 900 | 75 | 4 |
| 9 | supported | 0.1 | hexane | 0 | 900 | 75 | 3 |
| 10 | supported | 0.1 | hexane | 200 | 900 | 75 | 3 |
| 11 | supported | 0.1 | hexane | 75 | 870 | 75 | 3 |
| 12 | supported | 0.1 | hexane | 75 | 900 | 75 | 3 |
| 13 | supported | 0.1 | hexane | 75 | 900 | 75 | 4 |
| 14 | supported | 0.04 | hexane | 75 | 900 | 75 | 3.5 |
| 15 | supported | 0.04 | hexane | 75 | 900 | 75 | 4 |
| 16 | supported | 0.04 | hexane | 75 | 900 | 75 | 3.5 |
| 17 | supported | 0.04 | hexane | 75 | 900 | 120 | 3 |
| 18 | supported | 0.1 | hexane | 75 | 900 | 160 | 3 |

| Example | Reoxidant (eq/eq Pd) | Promoter (grams) | Reaction Rate (g/g Pd-h) | LVN (dl/g) | Bulk Density (lbs/cf) |
|---|---|---|---|---|---|
| 3 | 0 | 0 | 290 | 2.06 | 16.7 |
| 4 | 196/(BQ) | 2.48 | 80 | — | — |
| 5 | 0 | 0 | 730 | 1.56 | 17.9 |
| 6 | 0 | 0 | 190 | 1.76 | 5.8 |
| 7 | 14 (2.2 ml) (TBN) | 0 | 1580 | 1.07 | 22.1 |
| 8 | 14 (2.2 ml) (TBN) | 0 | 0 | — | — |
| 9 | 0 | 0 | 100 | 4.44 | 17.9 |
| 10 | 0 | 0 | 310 | 1.99 | 16 |
| 11 | 76 (BQ) | 0 | 200 | 2.53 | 16.7 |
| 12 | 0 | 0.5 | 430 | 4.39 | 22.4 |
| 13 | 49 (BQ) | 0.5 | 430 | 3.4 | 25 |

TABLE I-continued

| 14 | 17 (TBN) | 0   | 230  | 5.14 | —    |
|----|----------|-----|------|------|------|
| 15 | 0        | 0   | 150  | 3.3  | 19.2 |
| 16 | 386 (BQ) | 0.5 | 470  | 3.19 | 25   |
| 17 | 93 (BQ)  | 0.5 | 1040 | 0.28 | 37.2 |
| 18 | 76 (BQ)  | 0.5 | 60   | —    | —    |

TABLE II

| Example | Oxidation Solvent | Oxidant (eq/eq Pd) | Oxidation Time (hours) | Ligation Solvent   | P/Pd | Total Pressure (psig) | Time | Reaction Rate (g/g Pd-h) | LVN (dl/g) | Bulk Density (lbs/cf) |
|---------|-------------------|--------------------|------------------------|--------------------|------|-----------------------|------|--------------------------|------------|-----------------------|
| 3       | Acetonitrile      | 2                  | 18                     | Methylene Chloride | 2    | 870                   | 4    | 290                      | 2.06       | 16.7                  |
| 19      | Nitromethane      | 2                  | 22                     | Nitromethane       | 2    | 900                   | 3.5  | 250                      | 3.00       | 20.5                  |
| 20      | Acetonitrile      | 2                  | 24                     | Methylene Chloride | 1    | 900                   | 3    | 20                       | —          | —                     |
| 21      | Acetonitrile      | 2                  | 24                     | Methylene Chloride | 4    | 900                   | 3.5  | 100                      | 4.24       | —                     |
| 22      | Acetonitrile      | 2                  | 47                     | Methylene Chloride | 2    | 900                   | 4    | 280                      | 3.04       | 21.8                  |
| 23      | Acetonitrile      | 2                  | 60                     | Methylene Chloride | 2    | 900                   | 3.5  | 350                      | 2.64       | 25                    |
| 24      | Acetonitrile      | 4                  | 24                     | Methylene Chloride | 2    | 900                   | 3    | 0                        | —          | —                     |

Notes to Tables I and II:
1. Loading (g Pd/g) is the gram of palladium per gram of catalyst.
2. Reoxidant (eq/eq Pd) is the moles of reoxidant per gram atom of palladium.
3. BQ = p-benzoquinone.
4. TBN = t-butyl nitrite.
5. The promoter is polymeric 1,2-dihydro-2,2,4-trimethylquinoline.
6. Reaction rate (g/g Pd-h) is the grams of polymer produced per gram of palladium per hour.
7. LVN (dl/g) is described above.
8. Bulk Density (lbs/cf) is the pounds per cubic foot of polymer.
9. Oxidant (eq/eq Pd) is the moles of oxidant per gram atom of palladium.
10. P/Pd is the moles of phosphorus per gram atom of palladium.

EXAMPLE 25

An unsupported catalyst is prepared in the same manner as in Example 2 except:

(a) 0.109 gram of tetrakis(acetonitrile)palladium(II) tetrafluoroborate is used;

(b) 0.092 gram of bis(1,3-diphenylphosphino)propane is used.

A copolymer is prepared from this unsupported catalyst in the same manner as in Example 6 except:

(a) the reaction time is 3.75 hours (b) 184 equivalents of p-benzoquinone per gram-atom of palladium is used as a reoxidant.

The reaction rate is 1,480 grams of polymer per gram pelladium per hour.

EXAMPLE 26

An unsupported catalyst is prepared in the same manner as in Example 2 except:

(a) 0.100 gram of tetrakis(acetonitrile)palladium(II) tetrafluoroborate is used; and (b) 0.112 gram of bis (1,3-diphenyl phosphino) propane is used.

A copolymer is prepared from this unsupported catalyst in the same manner as in Example 6 except:

(a) 202 equivalents of p-benzoquinone per gram-atom of palladium is used as a reoxidant;

(b) 0.52 gram of polymeric 1,2-dihydro-2,2,4-trimethylquinoline is used as a promoter;

(c) the reaction temperature ranges from 75° to 110° C.

The reaction rate is 5,030 grams of polymer per gram palladium per hour.

EXAMPLE 27

An unsupported catalyst is prepared in the same manner as in Example 2 except:

(a) 0.122 gram of tetrakis(acetonitrile)palladium(II) tetrafluoroborate is used;

(b) 0.098 gram of bis(1,3-diphenylphosphino)propane is used.

A copolymer is prepared from this unsupported catalyst in the same manner as in Example 6 except:

(a) 202 equivalents of p-benzoquinone per gram-atom of palladium is used as a reoxidant (b) 0.54 gram of polymeric 1,2-dihydro-2,2,4-trimethylquinoline is used as a promoter;

(c) the reaction temperature is 80° C.;

(d) 60 psig of hydrogen is used;

(e) the total reactor pressure is maintained at 480 psig.

The reaction rate is 786 grams of polymer per gram palladium per hour.

We claim:

1. A process for the preparation of copolymers of one or more alpha-olefins and carbon monoxide comprising:

(a) introducing a mixture comprising one or more alpha-olefins, carbon monoxide, and, optionally, one or more dienes into a reaction zone under polymerization conditions;

(b) contacting the mixture with a catalyst prepared by a process comprising:

(i) reacting a transition metal in the zero valence state adsorbed on a support with an oxidant to form a supported compound wherein the metal has a positive valence;

(ii) ligating the supported compound with a ligand; and, optionally, (c) introducing a reoxidant into the reaction zone to maintain the positive valence of the metal.

2. A process for the preparation of copolymers of one or more alpha-olefins and carbon monoxide comprising:

(a) introducing a mixture comprising one or more alpha-olefins, carbon monoxide, and, optionally, one or more dienes into a reaction zone under polymerization conditions;

(b) contacting the mixture with a catalyst prepared in an inert atmosphere by a process comprising:

(i) reacting palladium, nickel, or rhodium metal in the zero valence state adsorbed on a support with an oxidant to form a supported compound wherein the metal has a positive valence;

(ii) ligating the supported compound with a ligand of phosphorus, nitrogen, antimony, arsenic, or sulfur; and, optionally, (c) introducing a reoxidant into the reaction zone to maintain the positive valence of the metal.

3. The process defined in claim 2 wherein a promoter is introduced into the reaction zone.

4. The process defined in claim 3 wherein the promoter is polymeric 1,2-dihydro-2,2,4-trimethylquinoline.

5. The process defined in claim 2 wherein one of the alpha-olefins is ethylene.

6. The process defined in claim 2 wherein the molar ratio of olefin monomer(s) to carbon monoxide is in the range of about 0.2:1 to about 5:1.

7. The process defined in claim 6 wherein the molar ratio of olefin monomer(s) to carbon monoxide is in the range of about 0.5:1 to about 2:1.

8. The process defined in claim 2 wherein hydrogen is introduced into the reaction zone in an amount of about 0.02 to about 1 mole of hydrogen per mole of olefin monomer(s).

9. The process defined in claim 2 wherein the amount of transition metal is about $9.4 \times 10^{-6}$ to about $4.7 \times 10^{-3}$ gram atom of transition metal per gram of support.

10. The process defined in claim 2 wherein the ratio of oxidant to transition metal is in the range of about 1 to about 3.5 moles of oxidant per gram atom of transition metal.

11. The process defined in claim 2 wherein the ratio of ligand to transition metal is about 0.5 to about 2 moles of ligand per gram atom of transition metal.

12. The process defined in claim 2 wherein the amount of transition metal introduced into the reaction zone via the catalyst is in the range of about $1.0 \times 10^{-6}$ to about $4.0 \times 10^{-4}$ gram atom of transition metal per mole of olefin monomer(s).

13. A process of the preparation of a copolymer of ethylene and carbon monoxide comprising:

(a) introducing a mixture comprising ethylene and carbon monoxide in an amount ranging from about 0.5 to about 2 moles of ethylene per mole of carbon monoxide into a reaction zone, under polymerization conditions;

(b) contacting the mixture with a catalyst containing about $1.0 \times 10^{-5}$ to about $4.0 \times 10^{-5}$ gram atom of palladium, nickel, or rhodium per mole of olefin(s) prepared in an inert atmosphere by a process comprising:

(i) adsorbing the transition metal in the zero valence state on an inert support in an amount of about $9.4 \times 10^{-5}$ to about $1.9 \times 10^{-3}$ gram atom of transition metal per gram of support;

(ii) reacting the supported metal with an oxidant in an amount ranging from about 1.5 to about 2.5 moles of oxidant per gram atom of transition metal to form a supported compound wherein the metal has a positive valence; and (iii) ligating the supported compound with from abut 0.75 to about 1.5 moles of bidentate ligand of phosphorus, nitrogen, antimony, arsenic, or sulfur per gram atom of transition metal; and (c) introducing a mixture of from about 1 to about 500 moles of reoxidant per gram atom of transition metal and from about 250 to about 1500 moles of promoter per gram atom of transition metal into the reaction zone.

14. The process defined in claim 13 wherein the transition metal is palladium, the support is gamma-alumina, the oxidant is nitrosonium tetrafluoroborate, the ligand is bis(1,3-diphenyl-phosphino)propane, the reoxidant is p-benzoquinone or t-butyl nitrite, and the promoter is polymeric 1,2-dihydro-2,2,4-trimethyl quinoline.

* * * * *